Feb. 3, 1959 N. M. HAYNES 2,872,531

SOUND RECORDERS

Filed Oct. 25, 1955 4 Sheets-Sheet 1

INVENTOR.
Nathan M. Haynes
BY
D. Stephen Baker
ATTORNEY

Feb. 3, 1959 N. M. HAYNES 2,872,531

SOUND RECORDERS

Filed Oct. 25, 1955 4 Sheets-Sheet 2

INVENTOR.
Nathan M. Haynes
BY
R. Stephen Baker
ATTORNEY

Feb. 3, 1959 N. M. HAYNES 2,872,531

SOUND RECORDERS

Filed Oct. 25, 1955 4 Sheets-Sheet 3

INVENTOR.
Nathan M. Haynes
BY
A. Stephen Baker
ATTORNEY

INVENTOR.
Nathan M. Haynes
BY
A. Stephen Baker
ATTORNEY 2,872,531

SOUND RECORDERS

Nathan M. Haynes, New York, N. Y.

Application October 25, 1955, Serial No. 542,568

7 Claims. (Cl. 179—100.2)

This invention relates to sound recorders and reproducers particularly of the magnetic tape type.

The invention is primarily directed to a recorder which is portable and camouflaged in normal operation so that it is suitable for making so-called secret recordings. Of course, this is not the sole utility of the instrument since it is obviously capable of making recordings under any normal circumstances whether secret or not. The invention is specifically illustrated in connection with a portable recorder which is maintained in a traveling case such as a briefcase.

In a large measure, the invention is directed toward camouflaging the nature of the briefcase and so as to give the impression that the briefcase is a conventional one. While this general objective is not, of itself, new, the specific details shown in this invention provide a device which is better directed to that end. Thus, the briefcase is formed of two separate chambers. One of these chambers houses the recorder mechanism and is generally maintained closed during all operations. The other chamber is exposed to view when the flap of the briefcase is open. Accordingly, when the operator opens such flap, only one of the chambers is exposed. Such chamber may have bellows and other refinements which would lead the observer to believe that the briefcase contains no secretive contents or mechanism since he is induced to view it as a conventional briefcase.

An element of importance in this invention is the use of a normal or conventional lock or switch to activate the concealed recorder mechanism. Thus, the briefcase is provided with what is apparently a conventional lock. This lock is, however, modified in accordance with my invention so that it really serves as an electrical switch which turns on the recording mechanism and prepares it for recording. Accordingly, the operator may give the impression that he is merely actuating the lock of the briefcase whereas he is actually putting into operation the recorder itself. In fact, I have so arranged the switch so that it not only energizes the tape reel drive motor and the amplifier, but also operates a relay so as to unlock the reels and make them free to rotate. It may be noted that the reels are normally maintained locked against accidental rotation so that the operator may walk with the briefcase without causing tape to spill. When, however, he turns on the recorder by the switch above referred to, he automatically unlocks the reels so as to permit proper operation of the device.

A further important element of the invention is the disposition of the microphone. The microphone is so placed as to take advantage of the formation of the briefcase as an acoustical chamber. Thus, the top portion of the briefcase has a chamber formation which simulates a large ear. It thus serves as a sound collector in which the microphone is most advantageously disposed. Accordingly, not only is the microphone concealed from normal view but its operation is far more sensitive than if it were disposed at random in a wall of the briefcase.

A further aspect of the present invention is the arrangement of the speed governor. Substantially all recorder mechanisms of this type require a speed governor so that the tape operates at the correct linear speed. A form of centrifugal governor was set forth in my Patent No. 2,677,727. Substantially the same governor is employed in this invention save that its disposition in the train of transmission is changed. Normally, as will be hereinafter explained more fully, a motor, through suitable reduction gearing, is employed to drive the capstan which, in turn actuates the tape. This must be a precision operation since even a small deviation from proper speed will cause a distortion. Conventionally, a governor is disposed in shunt with the capstan shaft and dissipates energy so as to compensate for variations in either the driving source power or in the work load. Further, a gear reduction train is necessary for stepping down the motor speed to about 78 R. P. M. since the capstan must be driven at such lower speed. Under these conditions, any variations and discrepancies within the gear train would tend to reflect themselves as a flutter in the capstan drive.

I avoid the disadvantages immediately above noted by interposing the governor in series with the motor drive and the capstan shaft. The governor is then driven at a high speed and its normal gear coupling to the capstan shaft is further utilized to accomplish speed reduction. Thus this gear coupling serves a dual function, eliminating the necessity for intervening gears. In addition, the efficiency of the system is greatly improved, a most important consideration in the use of a portable recorder.

Although the recorder of this invention has many other features, such as the reel support to which I will refer later, I might here mention the erase mechanism which is simplified considerably relative to prior structures. Thus, the erasing mechanism takes the form of a post which also serves as a tape guide. The post itself is in the form of a disk magnet which can be swivelly operated to bring the air gap of the disk either towards the tape or away from the tape. Suitable indicia is provided for this purpose. Normally, the post serves as a tape guide but when rotated 180° it brings the gap of the magnet in contact with the tape and provides erasure. This erasure may be accomplished while a new recording is being made as is well understood.

The invention will be further understood from the following description and drawings in which.

Figure 1:
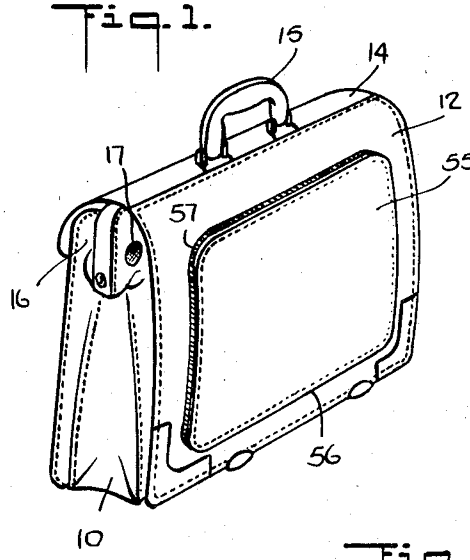
Figure 1 is a side perspective view of the briefcase recorder with the recorder compartment facing outward.
Figure 2:
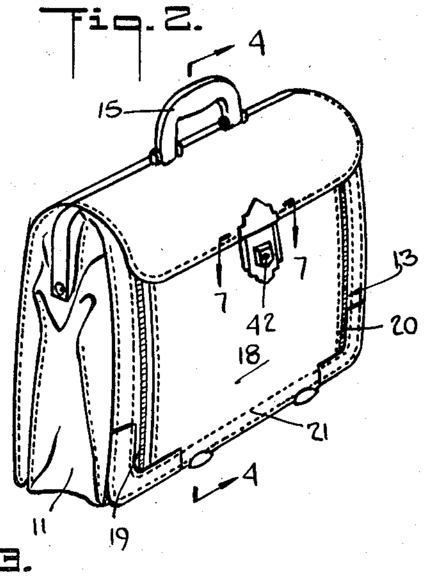
Figure 2 is a view similar to Figure 1 but with the folder compartment facing outwardly.

Referring now to Figures 1 to 4 it will be observed that, in the form shown, the recorder takes the form of a portable leather briefcase having substantially conventional sides 10 and 11 which are formed with the usual folds. The briefcase is further provided with a back 12, a front 13, and a top flap 14, which serves as a cover or closure member.

Cover 14 is provided with the usual handle 15. The sides 10 and 11 are formed with the usual folds as above stated to permit expansion of the briefcase. Such folds result in the formation of upper recesses 16, which assume the physical form of cup-like or ear-like formations. I have utilized such recesses 16 for the disposition of a microphone 17. Accordingly, recesses 16 function as collectors of sound which are picked up by the microphone 17 so as to render the microphone highly sensitive and thus increase the efficiency of the unit. It will be observed that the microphone 17 is disposed on a side wall of the recess. Such disposition of the microphone 17 further serves to conceal it so as to camouflage the nature of the recorder.

Disposed on the outer wall constituting the front face of the suitcase is a flap wall 18 which is secured to such front face by side hookless fasteners 19 and 20, the bottom edge of the flap wall being sewn to the front of the case at 21. When the side hookless fasteners 19 and 20 are unfastened, the front flap wall 18 may be extended forwardly or outwardly so as to expose a number of compartments 22 (Figure 4) in which papers or other material generally found in briefcases may be deposited. Immediately following the compartments 22 is an internal wall 23 which is common to and serves as a wall of the recorder compartment although the casual observer will not so understand it.

Wall 23 extends to the top of the briefcase and is closed by a locking mechanism 24 which serves as a lock for the recorder compartment or chamber as will hereinafter be explained. Accordingly, when the flap cover 14 is raised and opened, the front flap wall 18 may be unfastened and drawn outwardly so as to expose the compartments 22. An observer will not be led to believe that the briefcase contains other than the normal papers because whereas the compartments 22 are exposed, the recorder compartment is shielded or concealed by the full wall 23.

Reference will not be made to the locking mechanism for the recorder. Such locking mechanism seems to assume conventional form. Thus it comprises an upper locking member or clip 25 formed with a tongue 26. Tongue 26 is usually a U-shaped member, the opening of which is designed to be engaged by a locking bar in the lower, complementary locking member.

Figures 4, 5, 6, 7, 8:
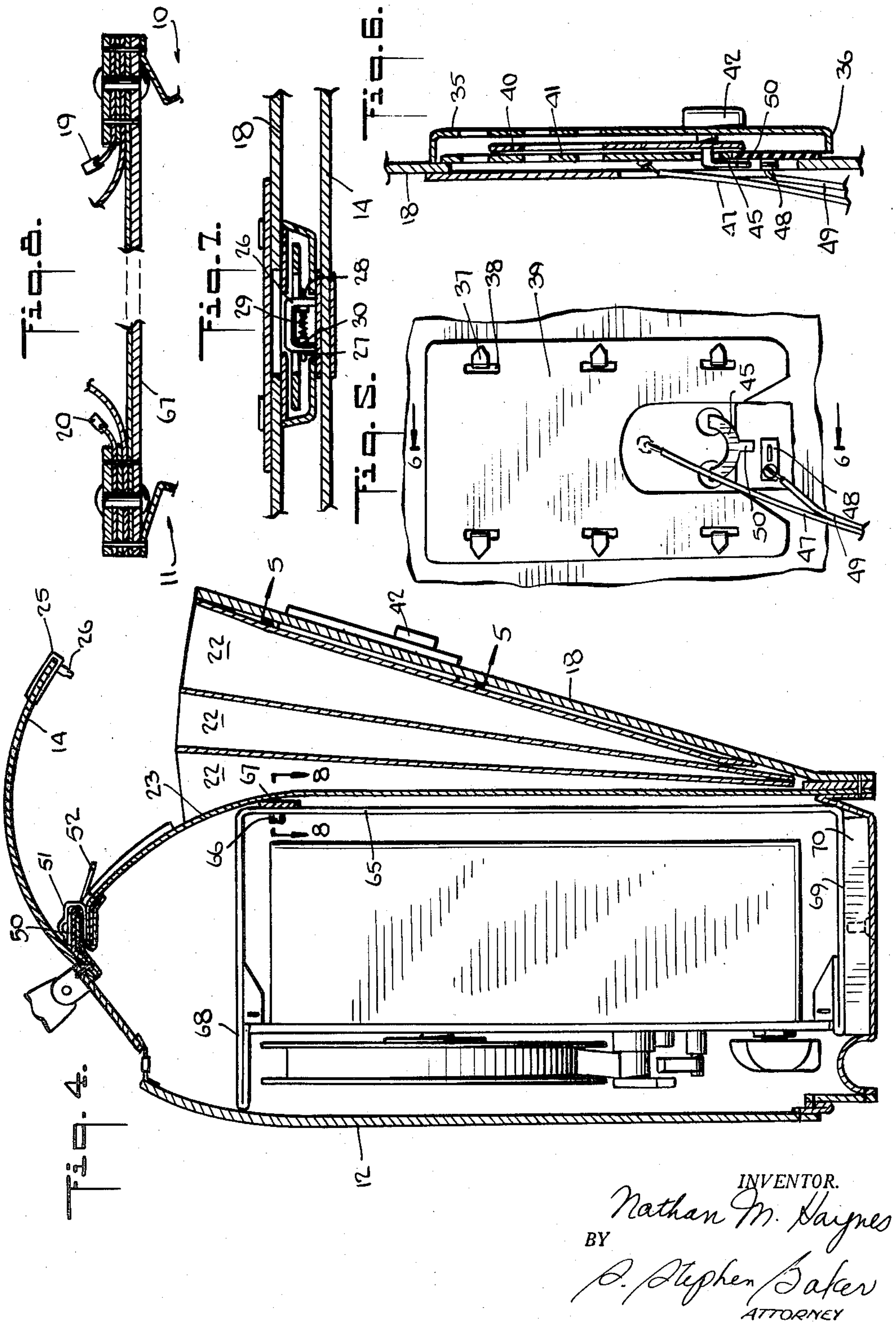
Figure 4 is an enlarged, cross-sectional view as taken along the line 4—4 of Figure 2.
Figure 5 is an enlarged, cross-sectional view as taken along the line 5—5 of Figure 4.
Figure 6 is a cross-sectional view as taken along the line 6—6 of Figure 5.
Figure 7 is an enlarged, cross-sectional view as taken along the line 7—7 of Figure 2.
Figure 8 is an enlarged, cross-sectional view, partly broken away, as taken along the line 8—8 of Figure 4.

In the recorder as illustrated, the tongue 26 remains U-shaped as illustrated in Figure 7 but the opening of the U is not designed to be engaged by a complementary locking bar as is conventional. On the contrary, it is formed with a pair of pins 27 and 28, which are spring urged outwardly by spring 29. Collars 30 prevent complete outward displacement of the pins. The pins 27 and 28 have rounded outer edges, as will be observed so that they are capable of being manually urged into an opening so as to thereby compress the spring, the spring thereafter expanding so as to secure the engagement of the pins in the opening. Accordingly, locking in the flap 14 is effected by merely pushing the tongue 26 into an appropriate opening as will be hereinafter set forth, whereupon the pins 27 and 28 are cammed into entry of such opening and thereafter urged by the spring into engagement.

Lower, complementary locking member 34 is disposed on flap 18 and appears to assume conventional form. Thus, it comprises a fixed, externally disposed brass front plate 35 having a circumferential spacing flange 36 which further has integral bendable clasping fingers 37. Such fingers 37 extend through openings 38 of the inner plate 39 disposed against the inner surface of flap 18. An elongated arm 40 is slidably disposed between brass plate 35 and back plate 41 which is maintained spaced from front plate 35 by the flange 31. Elongated, slidable arm 40 has the usual finger piece 42, which slides upon brass plate 35. As will be well understood, the slide 42 is of the conventional type serving to lock or unlock a briefcase flap. This is conventionally accomplished by means of a slidable tongue connected to the slide 42. In the present instance, however, such slidable tongue is eliminated so that the slide 42 does not serve the function of locking or unlocking the briefcase. On the contrary, as has been pointed out hereinabove, the locking and unlocking is effected by means of the tongue 26 and with its pins 27 and 28.

Slide 42 actually serves the function of putting the recorder in operation as will be hereinafter described. As such in actuality, it serves as an electrical switch and not as a mechanical lock. This is accomplished in the following manner.

Secured to the lower end of arm 40 is an arcuate switch contact 45. Contact 45 is therefore arranged to slide vertically as the arm 40 is actuated vertically by the slide 42. Back plate 41 is of metal and is arranged to serve as one terminal for an electrical circuit. Thus, wire 47 is connected as by solder to metal back plate 41. Arcuate contact member 45 effectively slides on back plate 41 so as to effect electrical contact therewith and thus serves as a ground terminal. The complementary or opposing terminal comprises a clip 48 which is secured to the flap 18 at its rear face, said flap serving as an electrical insulator. A wire 49 is connected to clip 48. Contact 45 is formed with a contact tip 50 which is designed to be engaged by clip 48 when the contact is in a lower position. Accordingly, it will be recognized that as slide 41 is slid downwardly, the contact 45 will make electrical contact with the clip 48 and the wires 47 and 49 will thereby form a portion of a closed electrical circuit. The actual details of this electrical circuit will be hereinafter set forth in the description of Figure 17.

The recorder chamber is formed by the wall 23, the rear wall or face 12, and the slides 10 and 11. Wall 23 and rear wall 12 connect together at their upper ends to form a closed compartment for the recorder. Such connection may assume any desirable form and is specifically illustrated herein as comprising locking mechanism 24. In the form shown, locking mechanism 24 simply comprises a metal plate 50 secured to the upper lip of wall 12 and which is frictionally engaged by a spring metal U-shaped clip 51 on the upper lip of wall 23. A hand-actuated tab 52 is further secured to the upper lip of wall 23 so that the locking mechanism 54 can be conveniently disengaged when access to the recording mechanism is desired.

Figure 3:
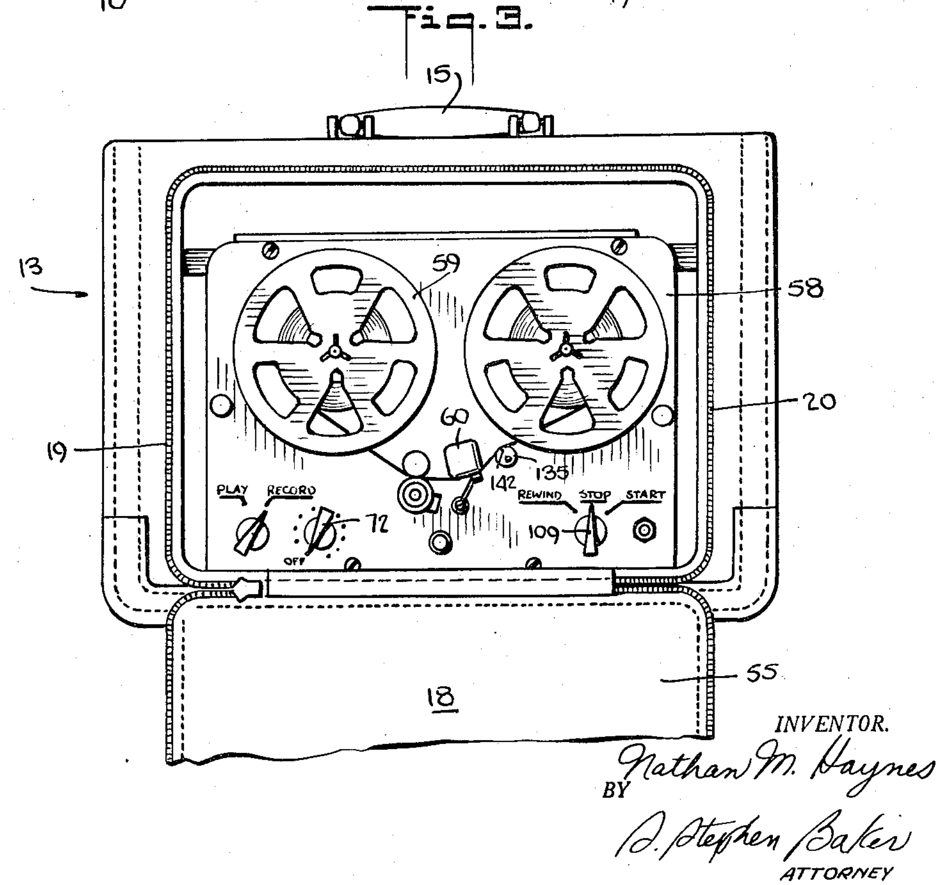
Figure 3 is a top plan view of the device of the article lying on its front face with the recorder compartment open.

Normal access to the recorder is permitted by means of door or flap wall 55 which is incorporated into wall 12. Flap wall 55 is hingedly connected at its bottom to wall 12 along the line 56 and it is further connected to the wall by means of a three quarter hookless fastener 57. When the hookless fastener 57 is opened, the flap wall 55 may be swung back as illustrated in Figure 3 whereupon the panel 58 of the recorder is made accessible.

The recorder mechanism, in general, is largely conventional, as was set forth in my prior Patent No. 2,677,727. Thus, panel 58 supports the usual supply reel 59, recording head 60, driven take-up reel 61, and the usual control switches. However, the framework for the recorder mechanism is not conventional and it will accordingly be briefly described. Thus, such framework is U-shaped in longitudinal cross-section and includes a rear plate 65 which is connected as by bolts 66 to a transverse metal strip 67 secured to the top portion of the inner face of wall 23. Integral with plate 65 is a top plate 68 which extends horizontally across the top of the recorder chamber, its outer end being folded over and contacting the inner face of flap 55 when the flap is in its normal, closed position. The outer end of top plate 68 appears as a shield or top cover for the panel 58 and the accessories supported thereon, but it actually serves a function of a spacer to maintain the flap 55 suitably spaced from such operating accessories. Thus, even should the briefcase be laid flatly upon flap 55, the front extending portion of top plate 68 will keep flap 55 away from the reels and other accessories so as to permit operation of the recorder in such position. The floor 69 of the framework is screwed to the floor 70 of the briefcase to stabilize the position of the framework in the briefcase. The panel 58 of the recorder is screwed as by bolts 71 (Figure 3) to nuts supported by the framework so as to provide a sturdy support for the unit within the recording chamber.

It will be well understood that operation of the recorder mechanism, just as in any other recorder, is effected by actuating a motor for the purpose of rotating the reels and at the same time energizing the pick-up and amplifying elements. Thus, the recorder includes the usual off-on switch and volume control 72 which is in series with the motor and battery circuit. This is conventional and need not be further described. However, it is evident that some other means must be provided to operate the recorder when it is being employed as a secret recorder. Obviously, this objective would be defeated if the operator were required to open flap 55 and turn on the switch 72 as well as any of the other switches. Accordingly, the operator pre-sets the controls for the desired purpose, i. e., the controls will be set for recording at a predetermined amplitude but the electrical circuit is nevertheless maintained open and the reels are maintained stationary. It is the switch action of contact member 45 which is arranged to close the circuit by means of a relay.

Figures 13, 14, 15, 16, 17:
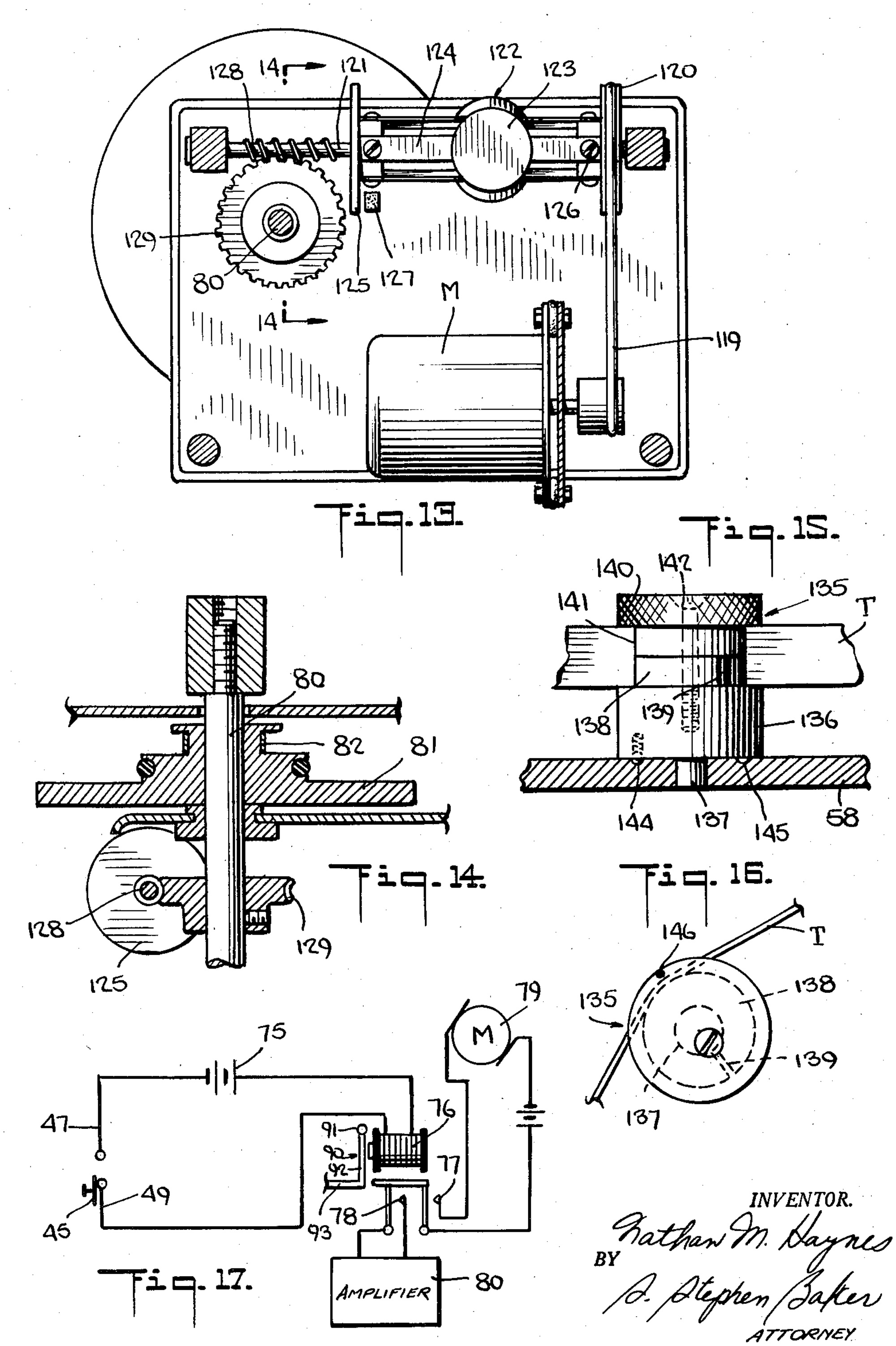
Figure 13 is a top plan of the motor governor and capstan drive viewed separately from the remaining mechanism.
Figure 14 is a cross-sectional view as taken along the line 14—14 of Figure 13.
Figure 15 is an elevational view of the combination tape guide and erasure post.
Figure 16 is a top plan view thereof.
Figure 17 is a circuit diagram illustrating the action of the on-off switch and relay.

Thus, referring to Figure 17 it will be observed that the wires 47 and 49 are arranged to be bridged by slidable switch member 45 as was above described. Such action closes a circuit which includes battery 75 and relay 76. Relay 76 has an armature (to be explained later) which closes two independent pairs of normally open contacts 77 and 78. When contacts 77 are closed by energization of relay 76, a circuit is closed to the motor 19 and the reels will begin to turn. At the same time, contacts 78 close another circuit which energizes the amplifier 80 which includes the recording head 60.

It will be understood therefore, that the recorder compartment may be maintained closed, its controls having been pre-set. When it is desired to make a secret recording, the operator is only required to actuate slide 42 downwardly until contact 45 energizes relay 76 whereupon the mechanism is put into action and a recording may be made. It will be recognized therefore, that the seemingly usual action of unlocking a briefcase by actuating the front slide, in reality sets the recorder in motion. If desired, the flap 18 may be pulled outwardly at the same time that the slide 42 is actuated so as to give the illusion that the actuation of the slide released the flap. If it is not necessary to give this impression, the user may simply actuate the slide 42 either with or without the knowledge of a bystander.

The user may carry the briefcase about, with its controls preset, in anticipation of making a recording at the proper time. However, means should be employed to fix the reels 59 against the undue rotation while the briefcase is carried about and a recording is not being made. For this purpose, I employ suitable brakes upon the shafts which drive the reels. Such brakes are operative when the recorder is not being used. However, I have provided a mechanical circuit actuated by relay 76 which releases the brakes when the slide switch 42 is operated so that the motor may easily drive the reels as required.

Figure 9:
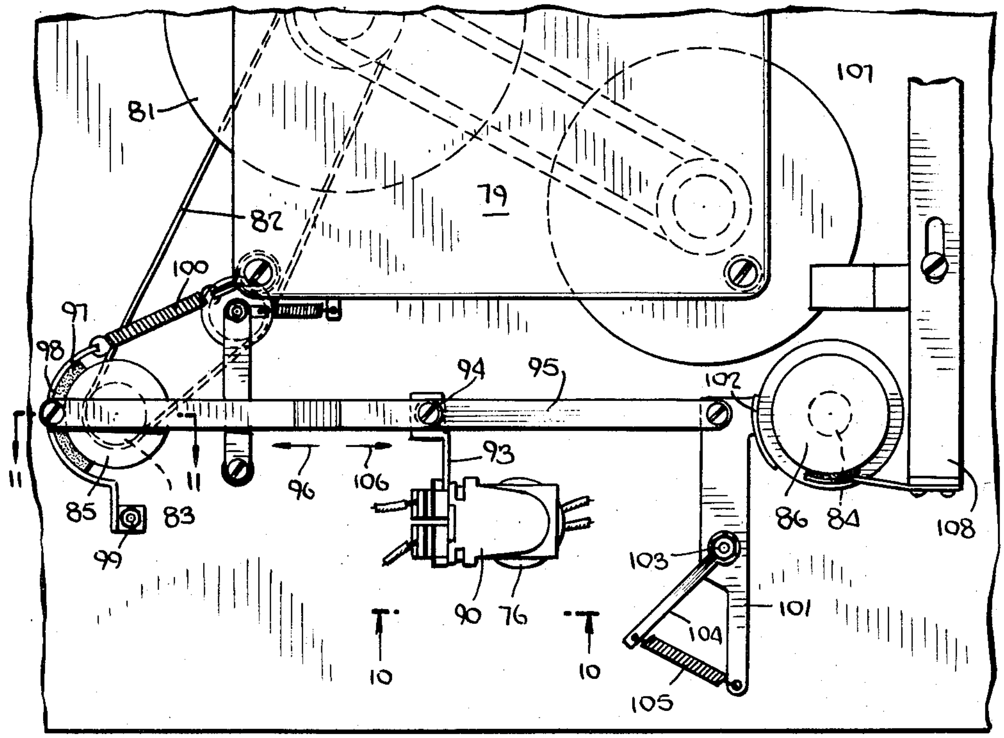
Figure 9 is a fragmentary, partly diagrammatic view illustrating the action of a brake release relay.

It will be observed in Figure 9 that the driving unit 79 includes a capstan shaft 80 which, as will be more fully explained, is driven by the motor M through the governor, both of these elements being incorporated in the driving unit 79. Secured to the capstan shaft is a fly wheel 81. A belt 82, actuated by a pulley on the capstan shaft, is employed to drive the reel shaft 83, this reel being the drive or take-up reel. Reel shaft 84 supports the supply reel. Shafts 83 and 84 are both provided with enlargement collars 85 and 86 respectively which serve as brake drums. A brake shoe system is provided which is controlled by the action of relay 76.

Figure 10:
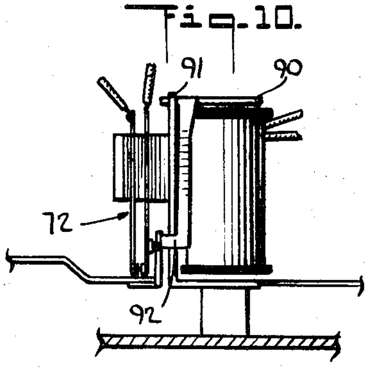
Figure 10 is a view as taken along the line 10—10 of Figure 9.

When relay 76 is energized, it attracts its armature 90 (Figures 9, 10 and 17), such armature 90 being effectively hinged along line 91. Accordingly, the depending arm 92 of armature 90 swings outwardly and serves to close electrical contacts as illustrated in Figure 17, one pair of these contacts being designated 77. However, the depending arm 92 further actuates an arm 93 which is secured as by bolt 94 to metal link 95. Accordingly, when the armature 90 is attracted downwardly, the arm 93 is actuated so as to urge link 95 horizontally in the direction of arrow 96.

To one end of link 95 is connected a brake shoe 97 which includes the brake shoe frame 98. Frame 98 is pivotally connected to the chassis by bolt 99. An opposite end thereof is connected by spring 100 to another portion of the chassis or the frame of driving unit 79 so that the brake shoe 97 is normally in braking contact with drive reel collar 85. Accordingly, the drive reel shaft 83 is normally braked against rotation.

Similarly, to the other end of link 95 is pivotally connected brake arm 101 to which is secured brake shoe 102. Brake arm 101 is pivoted to the chassis by bolt 103. The same bolt 103 secures arm 104 in an outward, fixed position and spring 105, connected between the outer end of pivoted brake arm 101 and stationary arm 104, tends to urge brake shoe 102 into braking engagement, with collar 86. Accordingly, the normal action of the link is to maintain both reel shafts braked.

It will be understood that when the relay 76 is energized for the purpose of starting the motor and the amplifier, it simultaneously actuates link 95 horizontally so as to release the brakes. When the relay is de-energized, the link returns to normal position, traveling in the direction of arrow 106 and restoring the brakes. Figure 9 shows parts of the driving mechanism in somewhat schematic form, these being unnecessary for an understanding of the invention and being more or less conventional. For example, pulley 107 is a reverse idler while slidable lik 108 is actuated by switch 109 (Figure 3) for the purpose of rewinding tape. However, these are not considered to be a part of this invention.

Figure 11:
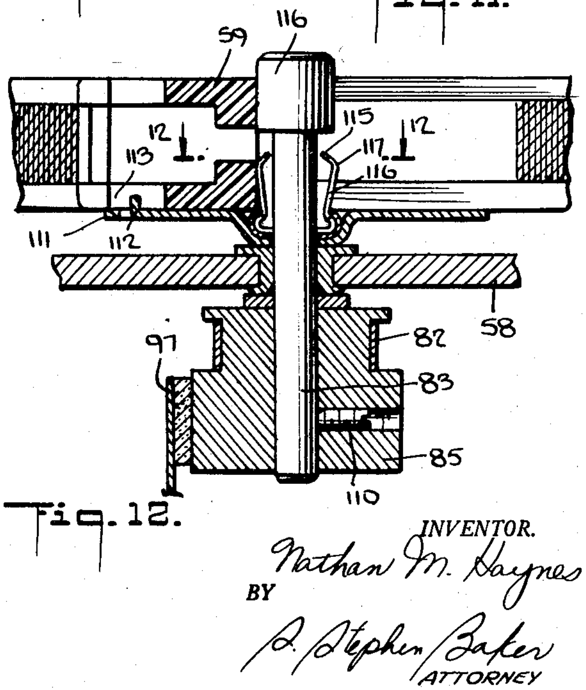
Figure 11 is an enlarged, cross-sectional view as taken along the line 11—11 of Figure 9.
Figure 12:
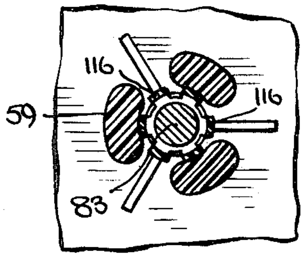
Figure 12 is a cross-sectional view as taken along the line 12—12 of Figure 11.

I have further devised a very simple method for securing the reels to the reel shafts. Thus, referring to Figure 11, it will be observed that the reel shaft 83 is secured to reel collar 85 by means of set screw 110. The reel collar is driven by belt 82 and is braked by brake shoe 97. As is conventional, a rotatable disk 111 is secured to shaft 83 so as to rotate therewith. It is formed with an upstruck tooth 112 which serves to engage an opening 113 in the reel 59. The center of disk 111 is depressed and seats a crown element 114 having a number of integral teeth 115. Teeth 115, it will be observed, have a lower portion which diverges outwardly from the center of disk 111, and, an upper portion which re-enters inwardly so that the free ends of the teeth are under and within the circumference of shaft head 116. It will be observed that reel 59 is secured to the shaft by applying it over the shaft head 116 as well as over spring fingers 115. The bend 117 which defines the lower and upper portions is normally radially spaced outwardly from the periphery of head 116. The fact that the free ends of the teeth define a circle which is of lesser diameter than that of head 116 permits the reel to be slipped over the head and over the spring fingers whereupon the bend 117 of the fingers hold the reel securely in position. In order to remove the reel, the operator applies upward lifting pressure so as to disengage it from the action of the spring fingers 115.

The improved form of speed governor system will now be described. Referring to Figure 13, it will be observed that the motor M, which in the form shown, is a conventional form of electric motor operated by conventional dry batteries which may aggregate six volts or the like, drives belt 119, which in turn drives pulley 120. Pulley 120 is connected to the governor shaft 121 to which is secured governor 122. Governor 122 comprises a plurality of radially arranged weights 123, springs 124 and a brake drum 125. The action of the governor will be well understood, it being recognized that, upon rotation of shaft 121, weights 123, being fastened to the shaft as by bolts 126, flip outwardly by centrifugal force and draws the brake drum or disk 125 inwardly until it is engaged by brake shoe 127, thereby inhibiting the speed of the capstan shaft when it tends to exceed a pre-determined limit. The action of the governor is thus conventional. The governor shaft 121 is terminated by a worm gear 128 which engages worm wheel gear 129 on the capstan shaft 80.

It will thus be recognized that the motor M, governor 122, gear 128, gear 129 and capstan shaft 80 are in a mechanical series arrangement as opposed to the conventional shunt system for governor mechanisms. The advantage of my system includes the increased efficiency of the driving mechanism, a serious consideration for portable recorders which are run on batteries. Other advantages include the fact that the governor is run at high speed directly from the motor so as to render it more sensitive to variations. For example, the speed on the particular motor illustrated is 5000 R. P. M. although it may be stepped down by pulleys to about one half that speed as it is connected to the governor shaft. However, even a speed of 2500 R. P. M. to the governor is of great advantage in increasing its sensitivity. Of course, it is necessary to step down this speed further in order to drive the capstan shaft 80 at the proper speed, i. e., about 78 R. P. M. and this may be effected by the gears 128 and 129 which are made with precision and which are required in any case. Accordingly, such gears 128 and 129 are employed to step down the speed to the required extent thereby eliminating the usual train of gears ordinarily employed for this purpose.

Referring now to Figures 15 and 16, a combination guide post and erasing mechanism 135 is disclosed. This guide post is located so as to follow the pick-up head as will be observed in Figure 3. It comprises a base collar 136 rotatably supported by a lower central post 137 which is rotatably mounted upon the panel 58. Secured to the upper face of collar 136 is an annular magnet 138 having the usual air gap 139. A knurled head 140 having a depending collar 141 is connected to magnet 138. The knurled head, magnet, and collar 136 are all connected so as to rotate bodily as a unit when manually actuated. Rotation of element 135 on its longitudinal axis is arranged to bring it into either one of two positions, said two positions being one wherein the gap 139 faces the tape in effective contact therewith as illustrated in Figure 16, and one wherein the gap is 180° away from the tape and the magnetic field acting on the tape is substantially zero. In the position where the gap 139 is adjacent the tape as illustrated in Figure 16, erasure of the magnetic signals will be accomplished by virtue of the well-known action of magnetic flux thereupon. On the other hand, when the element 135 is rotated 180° the neutral portion of the magnet is adjacent the tape, no flux will flow and erasure will be prevented.

As will be well understood, when the user is recording upon thereto unrecorded tape, he will not employ the erasure mechanism. When, however, he wishes to erase whether solely or in connection with a new recording, he will turn the element 135 so as to accomplish erasure. It will be observed that the collar 141 and erasing disk 138 are of a smaller diameter than knurled head 140 or collar 136 so as to form an annular recess serving as a guide for the tape T, which embraces the lateral edges of the tape. The magnet itself may assume conventional form, it being illustrated as a flat, substantially annular member which is narrow at its gap portion and wider at its rear or neutral portion. A bolt 142 is disposed through head 140, collar 141, the central opening of the magnet, and is threaded in collar 136 so as to maintain the parts assembled. In order to provide two rest positions, i. e., erasure and non-erasure, the collar 136 is provided with a spring loaded ball 143 which, upon rotation of the element 135, seats either in recess 144 or 145.

It will be further noted that element 135 may be provided with an indicia mark 146 so as to indicate to the user whether the element is being used in the erase position or not. At any rate, element 135 serves both as a tape guide post and a selectively operated erasure unit.

There has been shown what is now considered a preferred embodiment of the invention but it is obvious that changes and omissions may be made without departing from its spirit.

What is claimed is:

1. A tape recording mechanism comprising a leather case having an enclosed chamber, an electrical recording mechanism disposed within said chamber and including a circuit for energizing and actuating said recording mechanism, a closure member for said leather case, complementary locking means disposed on said closure member and an outer wall of said case respectively, a slider on said outer wall locking means, and an electrical switch adapted to be closed by manual actuation of such slider whereby an electrical circuit to said recording mechanism may be closed thereby.

2. A device according to claim 1 and wherein said outer wall locking means is formed with at least one opening therein, and tongue means on the complementary locking means on said closure member for securing said closure member to said outer wall locking means through one opening.

3. A device according to claim 2 and wherein said tongue means comprises at least one spring loaded pin adapted to be received and engaged by said opening independently of the action of said slider.

4. A device according to claim 3 and wherein said recording mechanism includes a drive motor, an amplifier, and a pair of rotatable reel members, brake means normally engaging to at least one of said reel members for discouraging accidental rotation thereof, said switch being operative to energize said motor and amplifier and also disengage said brake means from said reel member.

5. A tape recording mechanism comprising a leather case having an enclosed chamber, an electrical recording mechanism disposed within said chamber and including a circuit for energizing and actuating said recording mechanism, a closure member for said leather case, complementary locking means disposed on said closure member and an outer wall of said case respectively, a slider on said outer wall locking means, an electrical switch adapted to be closed by manual actuation of such slider whereby an electrical circuit to said recording mechanism may be closed thereby, said outer wall being formed with at least one opening therein, tongue means on the complementary locking means on said closure member for securing said closure member to said outer wall locking means through said opening, said tongue means comprising at least one spring loaded pin adapted to be received and engaged by said opening independently of the action of said slider, said recording mechanism including a drive motor, an amplifier and a pair of rotatable reel members, brake means normally engaging at least one of said reel members for discouraging accidental rotation thereof, said switch being operative to energize said motor and amplifier and also disengage said brake means from said reel member, said electrical circuit including a relay controlled by said switch, said relay upon energization thereof operating to close electrical switch contacts for both energizing said motor and said amplifier, an armature on said relay, a metal link connected to said brake means, said armature, upon energization of said relay, actuating said link for removing said brake means from its said reel member so as to disengage said reel member.

6. A tape recording device comprising a case having a top closure and a recorder mechanism completely enclosed within said case, said case being formed with a recessed cup-like formation on the upper end of at least one of the sides thereof, said top closure forming a top wall of said cup-like formation, and a microphone disposed inwardly in said cup-like formation and electrically connected to said recorder mechanism.

7. A device according to claim 6 and wherein said microphone is disposed in a side wall of the cup-like formation.

References Cited in the file of this patent

UNITED STATES PATENTS

| | | |
|---|---|---|
| 1,073,788 | Turner | Sept. 23, 1913 |
| 1,351,254 | Larrick | Aug. 31, 1920 |
| 1,699,971 | Johnson | Jan. 22, 1929 |
| 1,760,021 | Stone | May 27, 1930 |
| 1,951,931 | Henderson | Mar. 20, 1934 |
| 2,577,162 | Smith | Dec. 4, 1951 |
| 2,606,766 | Kuhlik | Aug. 12, 1952 |
| 2,609,457 | Thurm | Sept. 2, 1952 |
| 2,640,885 | Kuhlik | June 2, 1953 |
| 2,647,702 | Wright | Aug. 4, 1953 |
| 2,652,989 | Ripley | Sept. 22, 1953 |
| 2,683,774 | Camras | July 13, 1954 |
| 2,693,508 | Lord | Nov. 2, 1954 |
| 2,713,618 | McNabb | July 19, 1955 |
| 2,783,310 | Kuhlik | Feb. 26, 1957 |